(12) United States Patent
Chiang et al.

(10) Patent No.: US 10,690,616 B2
(45) Date of Patent: Jun. 23, 2020

(54) SETTING METHOD FOR CONDUCTING ELEMENT OF ELECTROCHEMICAL TEST STRIP

(71) Applicants: Cheng-Feng Chiang, Taoyuan (TW); Chien-Ying Chiang, Taoyuan (TW); Chien-Yi Chiang, Taoyuan (TW)

(72) Inventors: Cheng-Feng Chiang, Taoyuan (TW); Chien-Ying Chiang, Taoyuan (TW); Chien-Yi Chiang, Taoyuan (TW)

(73) Assignee: Cheng-Feng Chiang, Taoyuan (TW)

( * ) Notice: Subject to any disclaimer, the term of this patent is extended or adjusted under 35 U.S.C. 154(b) by 323 days.

(21) Appl. No.: 15/162,703

(22) Filed: May 24, 2016

(65) Prior Publication Data

US 2017/0292928 A1    Oct. 12, 2017

(30) Foreign Application Priority Data

Apr. 6, 2016    (CN) .......................... 2016 1 0207997

(51) Int. Cl.
*H05K 3/36*    (2006.01)
*G01N 27/30*    (2006.01)
*G01N 27/327*    (2006.01)
*B21D 35/00*    (2006.01)
*B29C 45/14*    (2006.01)
(Continued)

(52) U.S. Cl.
CPC ......... *G01N 27/307* (2013.01); *B21D 35/001* (2013.01); *B29C 45/14* (2013.01); *G01N 27/327* (2013.01); *G01N 27/3272* (2013.01); *H01R 43/16* (2013.01); *B29K 2105/20* (2013.01); *B29K 2705/00* (2013.01); *B29L 2031/40* (2013.01); *Y10T 29/49128* (2015.01)

(58) Field of Classification Search
CPC .............. G01N 27/307; G01N 27/3272; G01N 27/327; B29K 2105/20; B29K 2705/00; B29C 45/01; B21D 35/001; B29L 2031/40; H01R 43/16; H01L 23/4334; Y10T 29/49128; Y10T 29/49204; Y10T 29/4922
USPC .......................................... 29/830, 876, 883
See application file for complete search history.

(56) References Cited

U.S. PATENT DOCUMENTS 5,997,817 A  * 12/1999  Crismore ............... C12Q 1/001
                                                        204/403.1
8,482,023 B2 *  7/2013  Kim ..................... H01L 23/4334
                                                        257/675
9,933,386 B2 *  4/2018  Chiang ............. G01N 27/3272

FOREIGN PATENT DOCUMENTS

CN         203811568 U     9/2014
TW            I245119 B    12/2005
(Continued)

*Primary Examiner* — Donghai D Nguyen

(57) ABSTRACT

The present invention relates a setting method for a conducting element of an electrochemical test strip and electrochemical test strip thereof. An inspection body is formed by injection molding polymer plastic materials to coat with the plurality of conducting elements, and an external contact surface on an information outputting end of the conducting element is exposed from an inspection slot of the inspection body, so that the information outputting end of the conducting element is extended from the inspection body. Eventually, the information outputting end is bent to fix on a surface of the inspection body. The present invention is not complex and has more precision and convenience, and the manufacturing cost can be reduced efficiently, so that wide application can be expected in the near future.

9 Claims, 17 Drawing Sheets

(51) Int. Cl.
*H01R 43/16* (2006.01)
*B29K 105/20* (2006.01)
*B29K 705/00* (2006.01)
*B29L 31/40* (2006.01)

(56) References Cited

FOREIGN PATENT DOCUMENTS

| | | |
|---|---|---|
| TW | 201544810 A | 12/2015 |
| TW | 201604537 A | 2/2016 |
| TW | 201604538 A | 2/2016 |

\* cited by examiner

SETTING METHOD FOR CONDUCTING ELEMENT OF ELECTROCHEMICAL TEST STRIP

CROSS-REFERENCE TO RELATED APPLICATION

This application claims the benefit of China Patent Application No. 201610207997.7, filed on Apr. 6, 2016, in the State Intellectual Property Office of the P.R.C, the disclosure of which is incorporated herein in its entirety by reference.

BACKGROUND OF THE INVENTION

1. Field of the Invention

The present disclosure relates to a setting method for a conducting element of an electrochemical test strip and electrochemical test strip thereof. In particular, it relates to a manufacturing method of disposable test strip.

2. Description of the Related Art

As the improvement of medical science and manufacturing process of the related equipment, a disposable test strip which has a metal electrode and is adapted for inspecting liquid sample, such as blood, to further inspect concentration of the blood sugar, uric acid, cholesterol in the blood or concentration of the heavy metal and insecticide in sewage, is well developed and widely applied, and becomes an importance testing tool.

The electrochemical testing principle is widely applied to test various liquid samples. However, as disclosed in Taiwan patent issue no. 1245119, which is titled as "structure of electrochemical test strip and manufacturing process thereof". The main body has a through hole, and at least one physical electrode is embedded into the main body and fixed in the through hole to conduct signal, so that the structure of combining multiple layers can be avoided, and the testing function can be improved.

However, the manufacturing process for product is not easy actually, and has the problem of complex and requiring multiple processes to finish the product. Moreover, these processes are necessary to set electrodes on an inspection portion and only can be finished by the apparatuses with high precision. It causes the increasing of the manufacturing cost and is hard to lower the price. Therefore, it is not easy to widely apply.

In addition, as disclosed in Taiwan patent publication no. 201604537, 201604538, and 201544810, which provide an advanced structure of test strip and manufacturing process thereof. However, the production speed and its cost reduction have to be improved.

What is need is a setting method for a conducting element of an electrochemical test strip and electrochemical test strip thereof to improve the conventional technology, solve above-mentioned problems, and enhance application widely for industry.

SUMMARY OF THE INVENTION

In order to improve the disadvantages of the conventional technology, the present disclosure illustrates a setting method for a conducting element of an electrochemical test strip and electrochemical test strip thereof to solve the above-mentioned problems.

To achieve above-mentioned objective, the present invention provides a setting method for a conducting element of an electrochemical test strip, comprising: A. molding a metal conducting rack step, to mold the metal conducting rack on a conducting metal substrate by a metal processing method, the metal conducting rack including a holder connected to a plurality of conducting elements; wherein each the conducting element comprises an information reception end having an external contact surface, and each the conducting element further comprises an information outputting end having a transmission contact surface; B. embedded injection of a conducting inspection body step, to inject molding the inspection body of a polymer plastic material from the plurality of conducting elements on the metal conducting rack, and wherein the inspection body comprises an inspection slot and at least one accommodation portion, the inspection slot is disposed on a side of the inspection body and is recessed into an inner side of the inspection body, and each the external contact surface of the information reception end exposes from the surface of inspection portion, the information outputting end is extended and pass through the inspection body and corresponds to the accommodation portion; C. taking out the inspection body step, to get the inspection body from the holder of the metal conducting rack; and D. bending the information outputting end step, to bend the information outputting end toward the accommodation portion of the inspection body, and to expose from the transmission contact surface.

Preferably, the accommodation portion and the inspection slot are disposed in an identical surface.

Preferably, the accommodation portion and the inspection slot are disposed in contrary surfaces.

Preferably, the step of D further comprises bending an end portion of the information outputting portion to a predetermined angle to embed the end portion of the information outputting portion into at least one predetermined cavity on the accommodation portion.

Preferably, the external contact surface flushes with a bottom surface of the inspection slot.

Preferably, the external contact surface is lower than a bottom surface of the inspection slot.

Preferably, a number of the conducting elements are four.

Preferably, the accommodation portions are multiple slots arranged side by side.

Preferably, an inner end of the inspection slot comprises a groove.

To achieve above-mentioned objective, the present invention also provides an electrochemical test strip, comprising: a plurality of conducting element and an inspection body. Each the conducting element has an information reception end and an information outputting end, respectively. The information reception end has an external contact surface, and each the information outputting end has a transmission contact surface. The inspection body is made of plastic materials and coats with the plurality of conducting element by injection molding, and wherein the inspection body comprises an inspection slot and at least one accommodation portion, the inspection slot is disposed on a side of the inspection body and is recessed toward an inner side of the inspection body, and each the external contact surface of the information reception end exposes from the surface of inspection portion, the information outputting end is extended and bends in the accommodation portion, and exposes from the transmission contact surface.

Preferably, the accommodation portion and the inspection slot are disposed in an identical surface.

Preferably, the accommodation portion and the inspection slot are disposed in contrary surfaces.

Preferably, an end portion of the information outputting portion is bent to a predetermined angle to embed the end portion of the information outputting portion into at least one predetermined cavity.

Preferably, the external contact surface flushes with a bottom surface of the inspection slot.

Preferably, the external contact surface is lower than a bottom surface of the inspection slot.

Preferably, a number of the conducting elements are four.

Preferably, the accommodation portions are multiple slots arranged side by side.

Preferably, an inner end of the inspection slot comprises a groove.

To achieve above-mentioned objective, the present invention further provides a setting method for a conducting element of an electrochemical test strip, comprising: A. molding a metal conducting rack step, molding a metal conducting rack step, to mold the metal conducting rack on a conducting metal substrate by a metal processing method, the metal conducting rack including a holder connected to a plurality of conducting elements; wherein each the conducting element comprises an information reception end having an external contact surface, and each the conducting element further comprises an information outputting end having a transmission contact surface; B. embedded injection of a conducting inspection body step, to inject molding the inspection body of a polymer plastic material from the plurality of conducting elements on the metal conducting rack, and wherein the inspection body comprises an inspection slot and at least one accommodation portion, the inspection slot is disposed on a side of the inspection body and is recessed into an inner side of the inspection body, and each the external contact surface of the information reception end exposes from the surface of inspection portion, the information outputting end is extended and pass through the inspection body, and corresponds to the accommodation portion; C1. separating a partial end step, to separate the information outputting end from the holder; D. bending the information outputting end step, to bend the information outputting end toward the accommodation portion of the inspection body, and to expose from the transmission contact surface; and E. taking out the inspection body step, to take out the inspection body from the holder of the metal conductive rack.

According to the setting method for a conducting element of an electrochemical test strip and electrochemical test strip thereof, the manufacturing process of the electrochemical test strip is not complex and has more precision and convenience, so the manufacturing cost can be reduced efficiently. Therefore, the present invention can be widely applied.

Many of the attendant features and advantages of the present invention will becomes better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1:
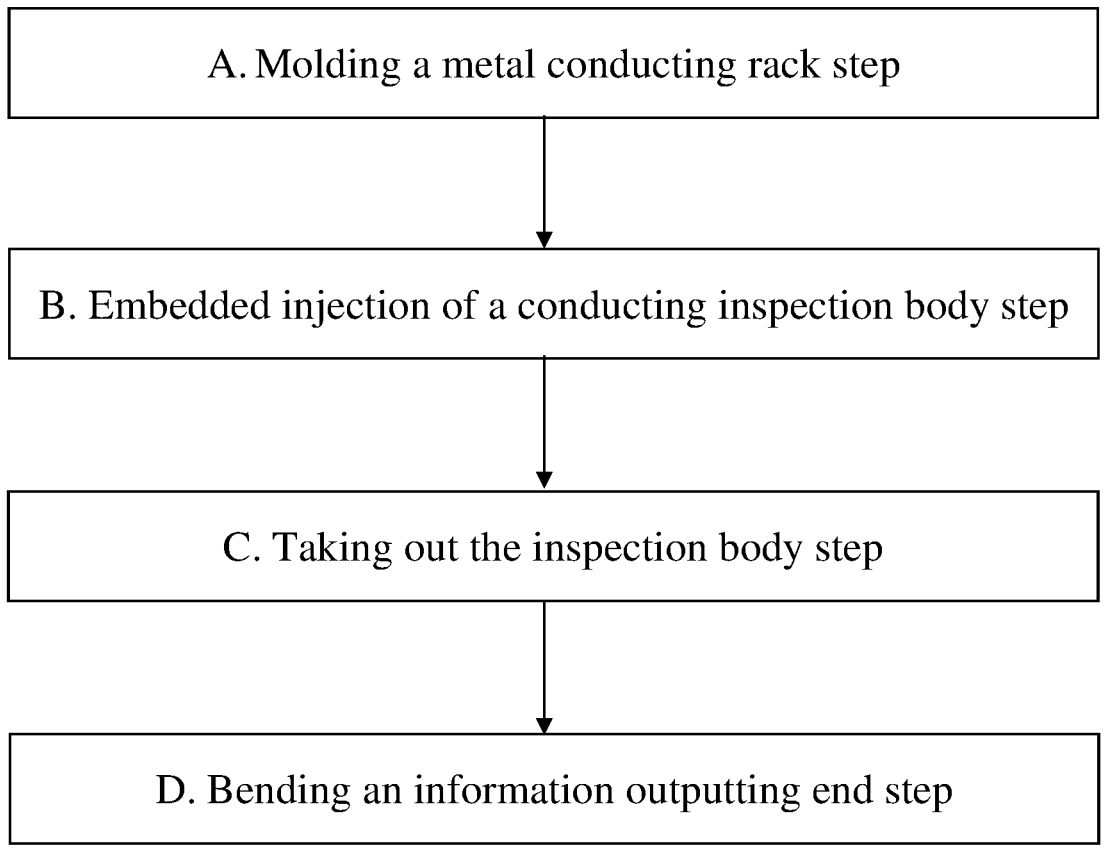
FIG. 1 is a flow diagram of a setting method for a conducting element of an electrochemical test strip in the present invention.

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

For convenience, certain terms employed in the specification, examples and appended claims are collected here. Unless defined otherwise, all technical and scientific terms used herein have the same meaning as commonly understood by one of the ordinary skill in the art to which this invention belongs.

The singular forms "a", "and", and "the" are used herein to include plural referents unless the context clearly dictates otherwise.

Please refer to FIG. 1, the present invention provides a setting method for a conducting element of an electrochemical test strip; wherein the method preferably comprises: A. molding a metal conducting rack step; B. embedded injection of a conducting inspection body step; C. taking out the inspection body step; and D. bending the information outputting end step.

Figure 2:
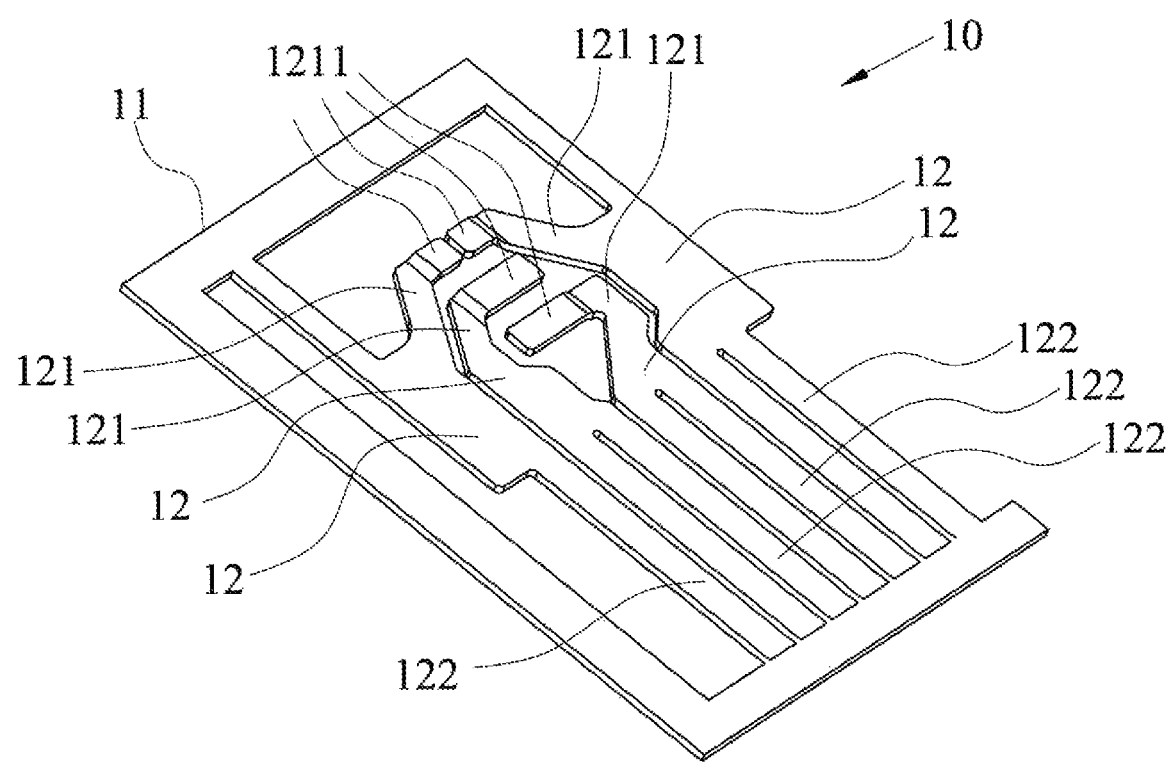
FIG. 2 is the first schematic diagram of an embodiment of the electrochemical test strip in the present invention.
Figure 3:
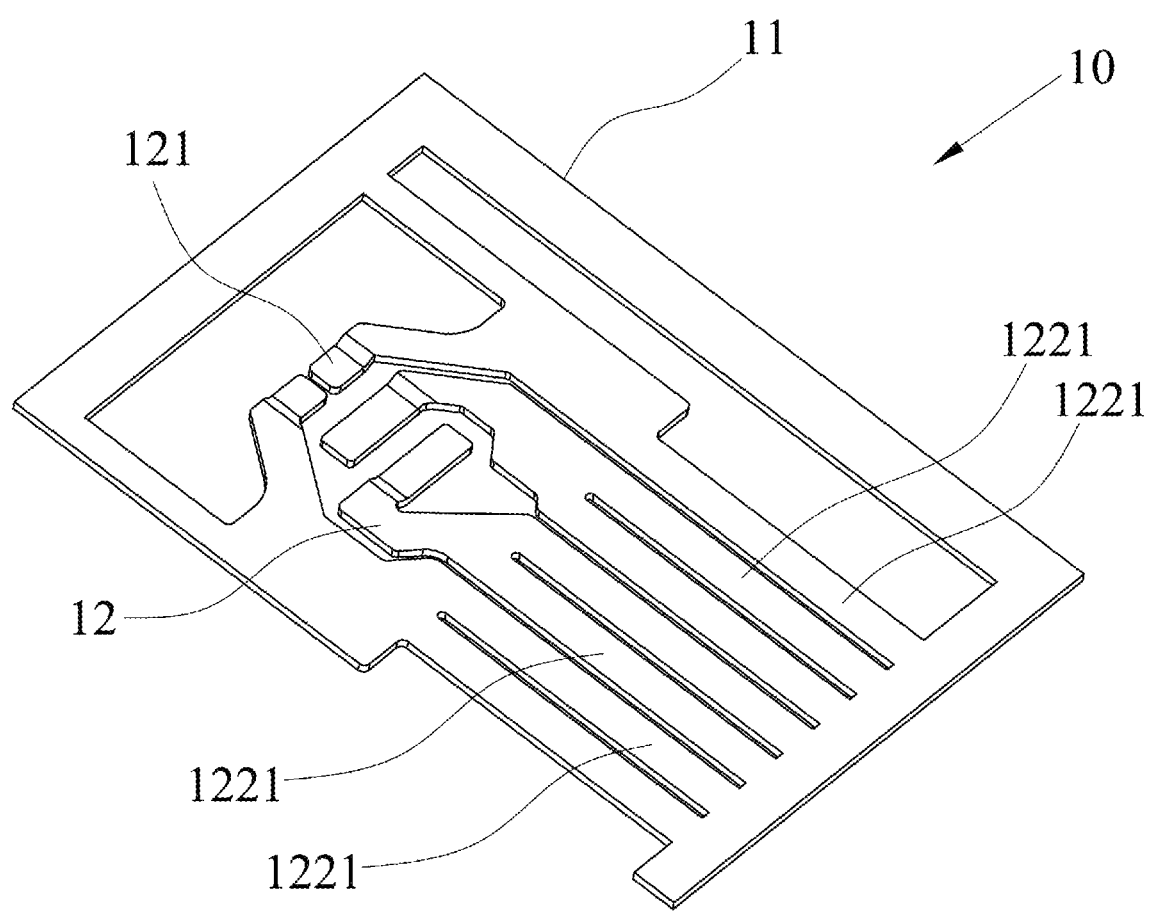
FIG. 3 is the second schematic diagram of an embodiment of the electrochemical test strip in the present invention.

Please further refer to FIGS. 2 and 3, the aforementioned step A is to use the metal process method including punching or cropping to form a metal conducting rack 10 on a conducting metal substrate. The metal conducting rack 10 comprises a holder 11 connecting to a plurality of conducting elements 12 and a number of connecting elements 12 are four; wherein each the conducting element 12 respectively has an information reception end 121, and the information reception end 121 has an external contact surface 1211. Each the conducting element 12 comprises an information outputting end 122, and each the information outputting end 122 has a transmission contact surface 1221.

It should be noted that the metal conducting rack 10 further serves as a surface protection layer, or a conducting protection layer can be formed on the surface of the metal conducting rack 10 after electroplating, chemical plating, and physical vapor plating (such as vapor sputtering, vapor deposition, and so on). Preferably, the conducting protection layer is nickel, gold, silver, tin, titanium, platinum, palladium, rhodium, ruthenium, iridium, chromium, iron, aluminum or is an alloy including at least two metals described above.

Figure 4:
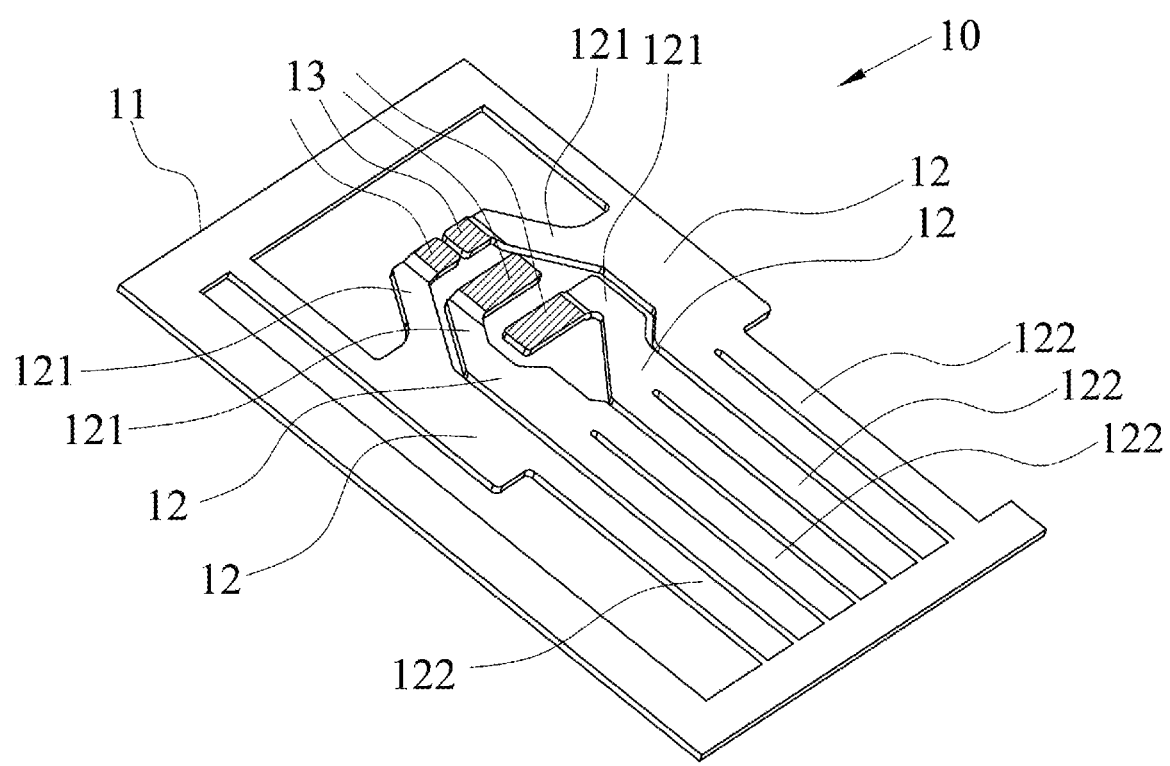
FIG. 4 is the third schematic diagram of an embodiment of the electrochemical test strip in the present invention.
Figure 5:
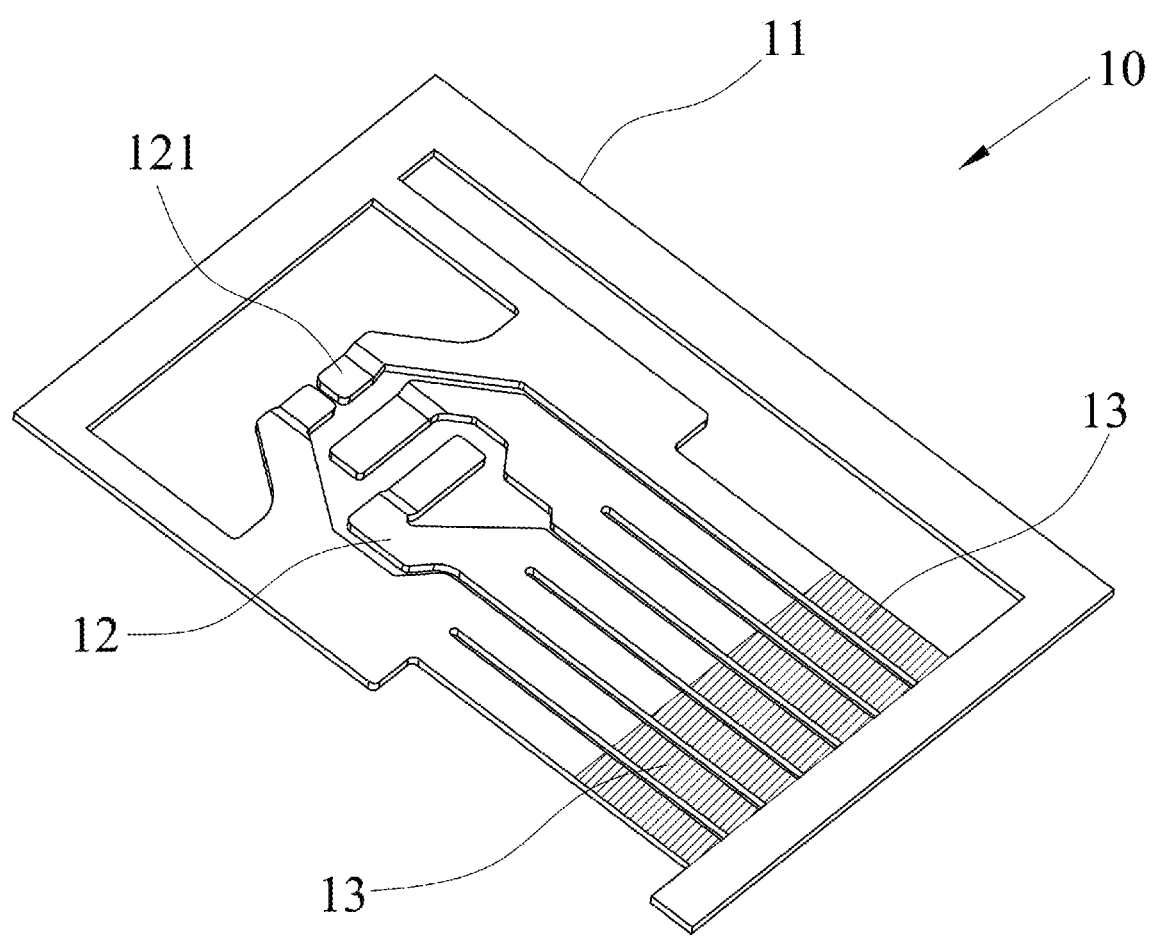
FIG. 5 is the fourth schematic diagram of an embodiment of the electrochemical test strip in the present invention.

Please further refer to FIGS. 4 and 5, a strengthened signal metal layer 13 is formed on the external contact surface 1211 of the information contact end 121 and the transmission contact surface 1211 of the information outputting end 122. Preferably, the strengthened signal metal layer 13 is plated with the metal with better conduction, such as gold, silver, platinum, palladium, rhodium, ruthenium, iridium, and so on.

Figure 6:
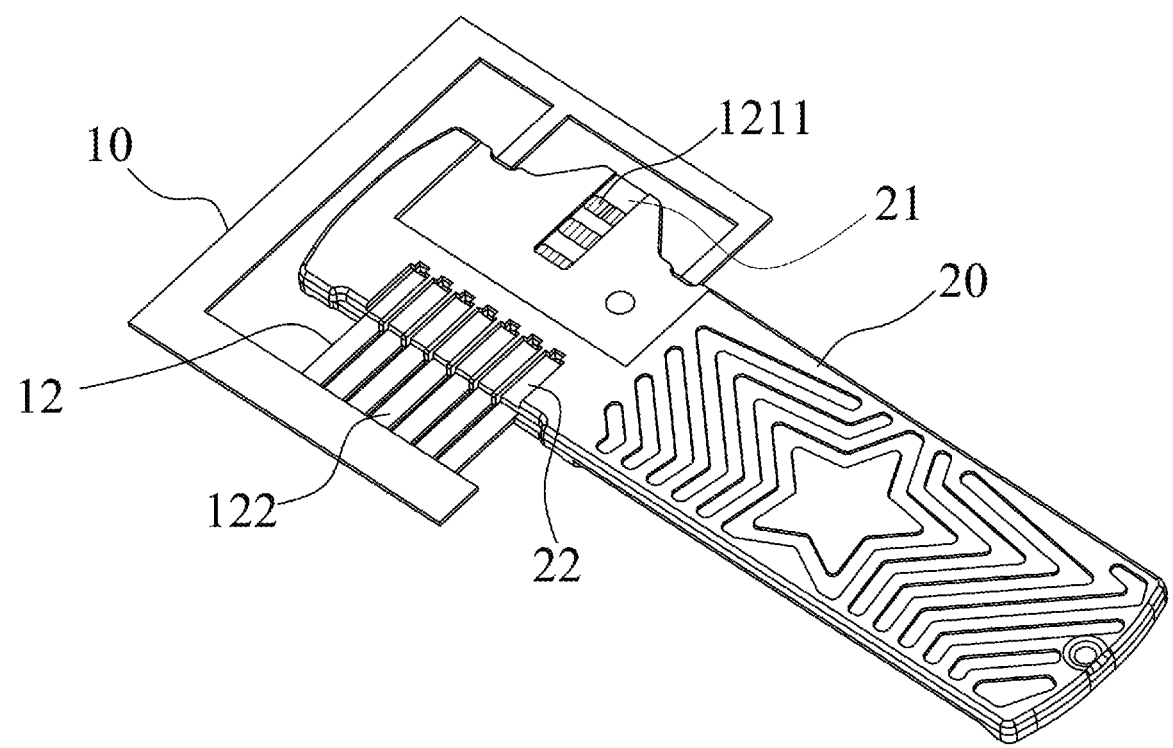
FIG. 6 is the fifth schematic diagram of an embodiment of the electrochemical test strip in the present invention.

Please refer to FIG. 6, the aforementioned step B is to inject molding the inspection body 20 of a polymer plastic material from the plurality of conducting elements 12 on the metal conducting rack 10.

Preferably, a side of the inspection body 20 comprises an inspection portion 21 and at least one accommodation portion 22, and the accommodation portions 22 can be multiple slots arranged side by side. The inspection slot 21 is disposed on a side of the inspection body 20 and is recessed into an inner side of the inspection body 20. The accommodation portion 22 is disposed on the inspection body 20, and can be set identical to or contrary with the surface of the inspection slot 21, but FIG. 6 is merely exemplary, but is not limited thereto. In addition, each the external contact surfaces 1211 of the information reception end 121 exposes from the surface of inspection portion 21, and the information outputting end 122 is extended and pass through the inspection body 20 and corresponds to the accommodation portion 22.

It should be noted that the external contact surface 1211 can flush with or be lower than a bottom surface of the inspection slot 21. The external contact surface 1211 flushing with a bottom surface of the inspection slot 21 is merely exemplary in this embodiment, but is not limited thereto.

Figure 7:
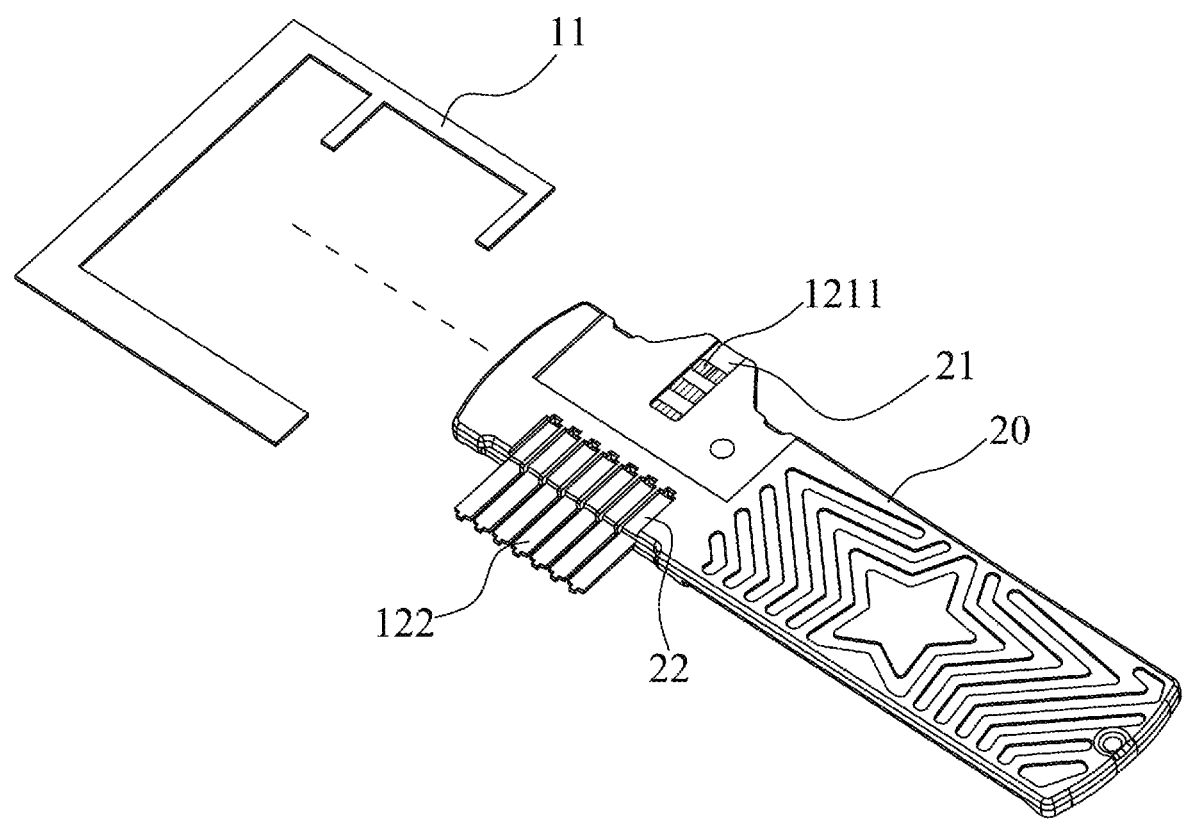
FIG. 7 is the sixth schematic diagram of an embodiment of the electrochemical test strip in the present invention.

Please refer to FIG. 7, the aforementioned step C is to get the inspection body 20 from the holder 11 of the metal conducting rack 10.

Figure 8:
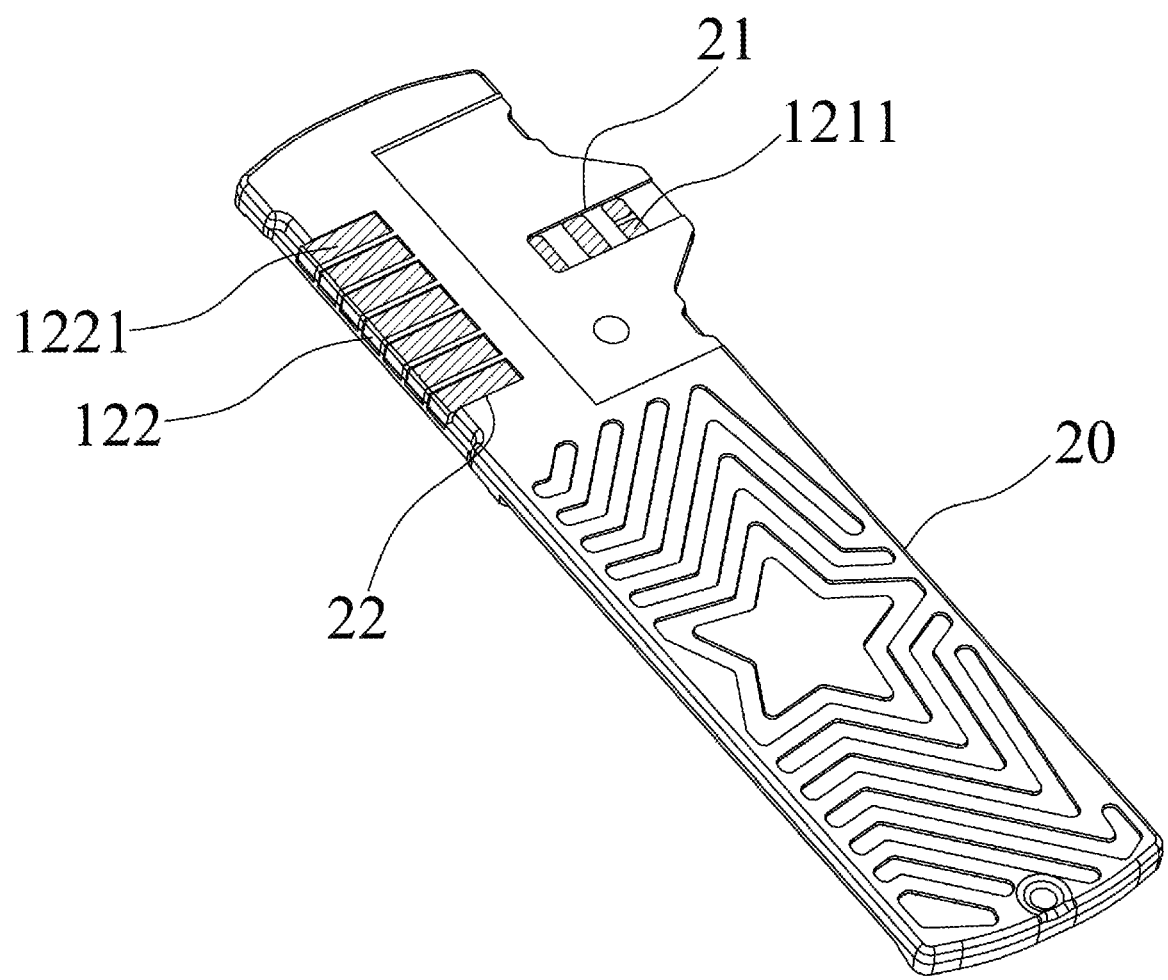
FIG. 8 is the seventh schematic diagram of an embodiment of the electrochemical test strip in the present invention.

Please further refer to FIG. 8, the aforementioned step D is to bend the information outputting end 122 toward the accommodation portion 22 of the inspection body 20, and to expose from the transmission contact surface 1221.

Figure 9:
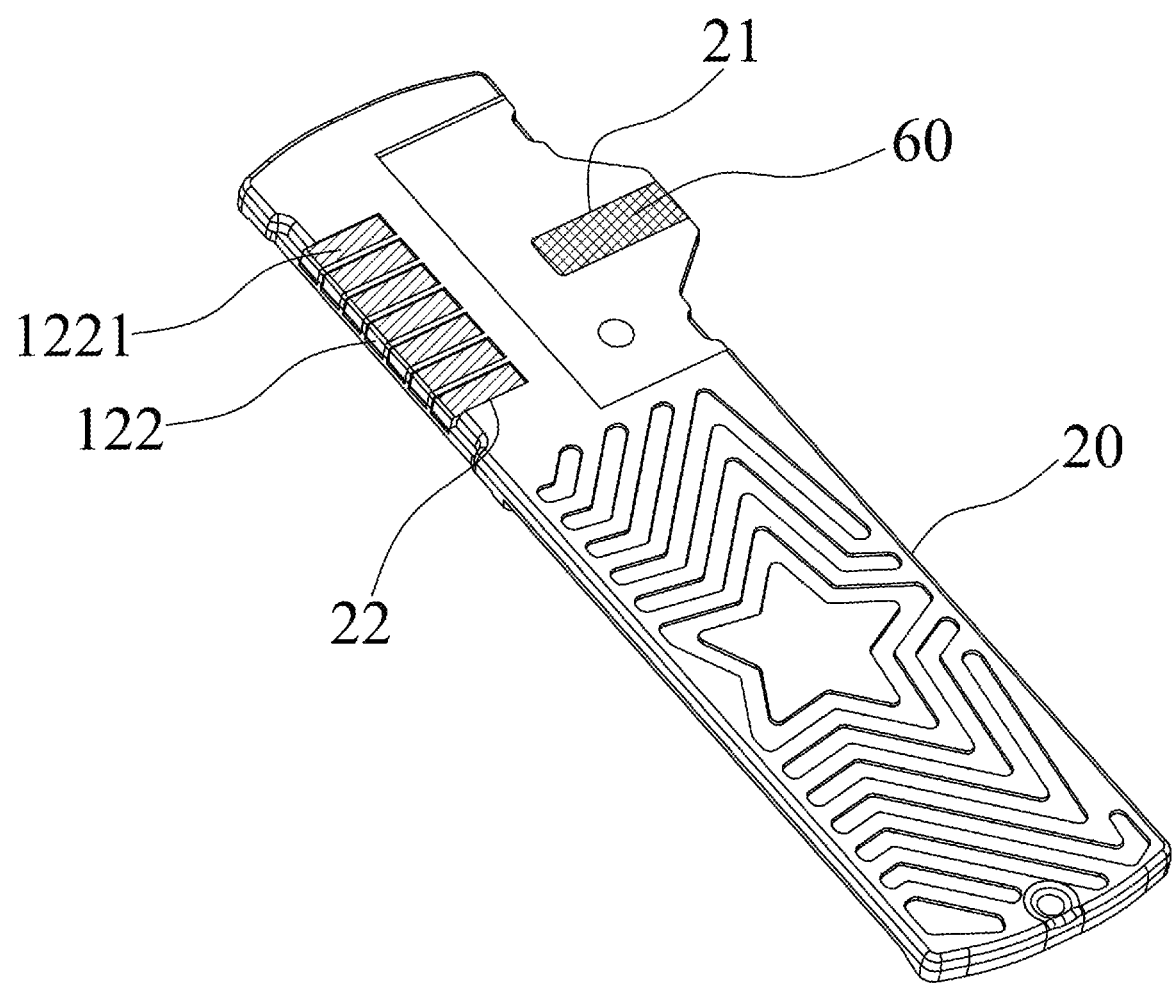
FIG. 9 is the eighth schematic diagram of an embodiment of the electrochemical test strip in the present invention.
Figure 10:
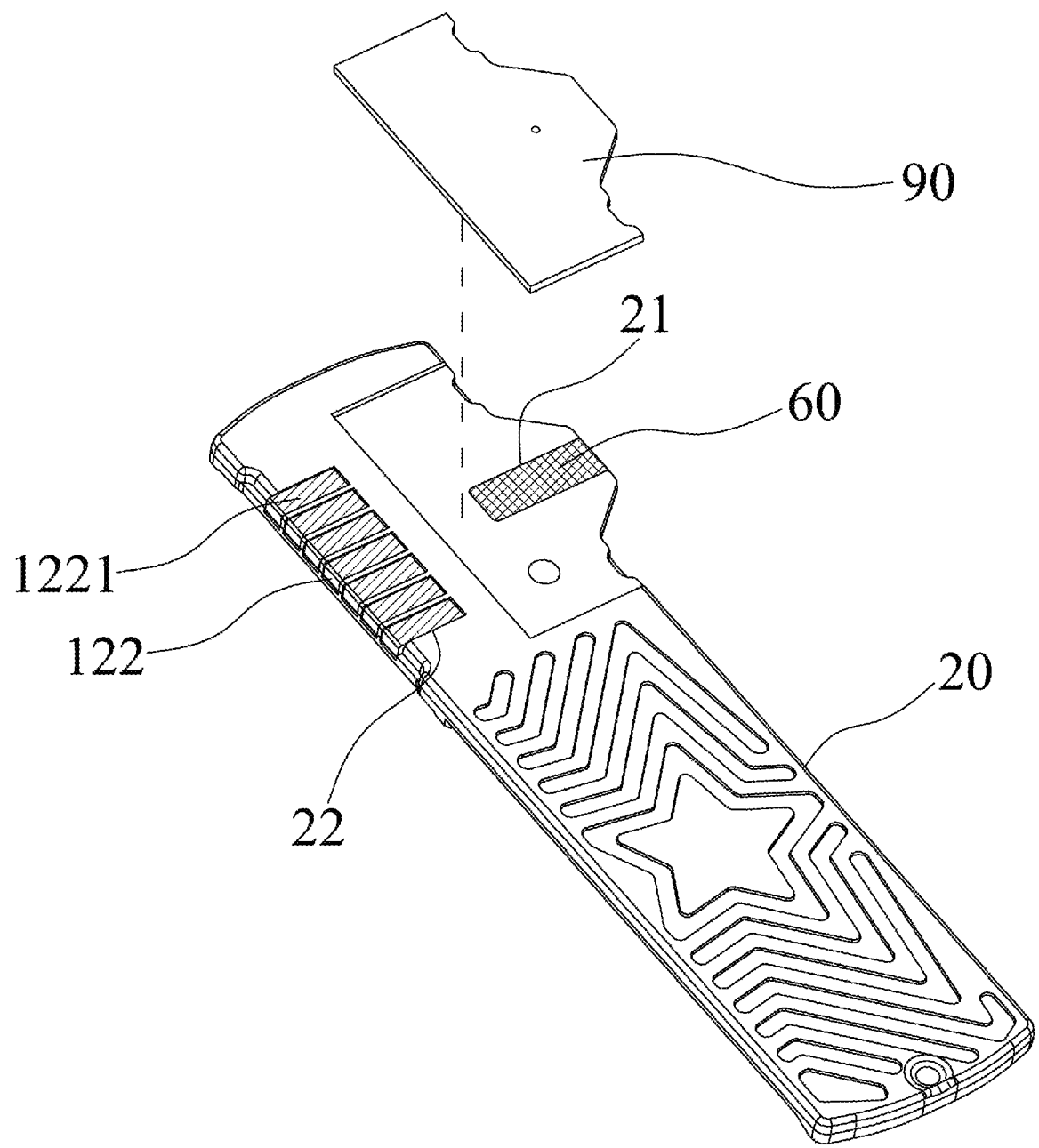
FIG. 10 is the ninth schematic diagram of an embodiment of the electrochemical test strip in the present invention.

Please refer to FIGS. 9 and 10, an electrochemical reaction layer is disposed on the inspection portion 21, and an electrochemical test portion 60 is formed by coating, droplet or distributing chemical agents on the inspection slot 21. A cover 90 covers on the surface of the inspection body 20, and allows forming an opening on an external side of the inspection portion 21 where liquid specimen can be dropped.

The present invention further provides another aspect of embodiment, still comprising A. molding a metal conducting rack step; B. embedded injection of a conducting inspection body step; C. taking out the inspection body step; and D. bending an information outputting end step.

Figure 11:
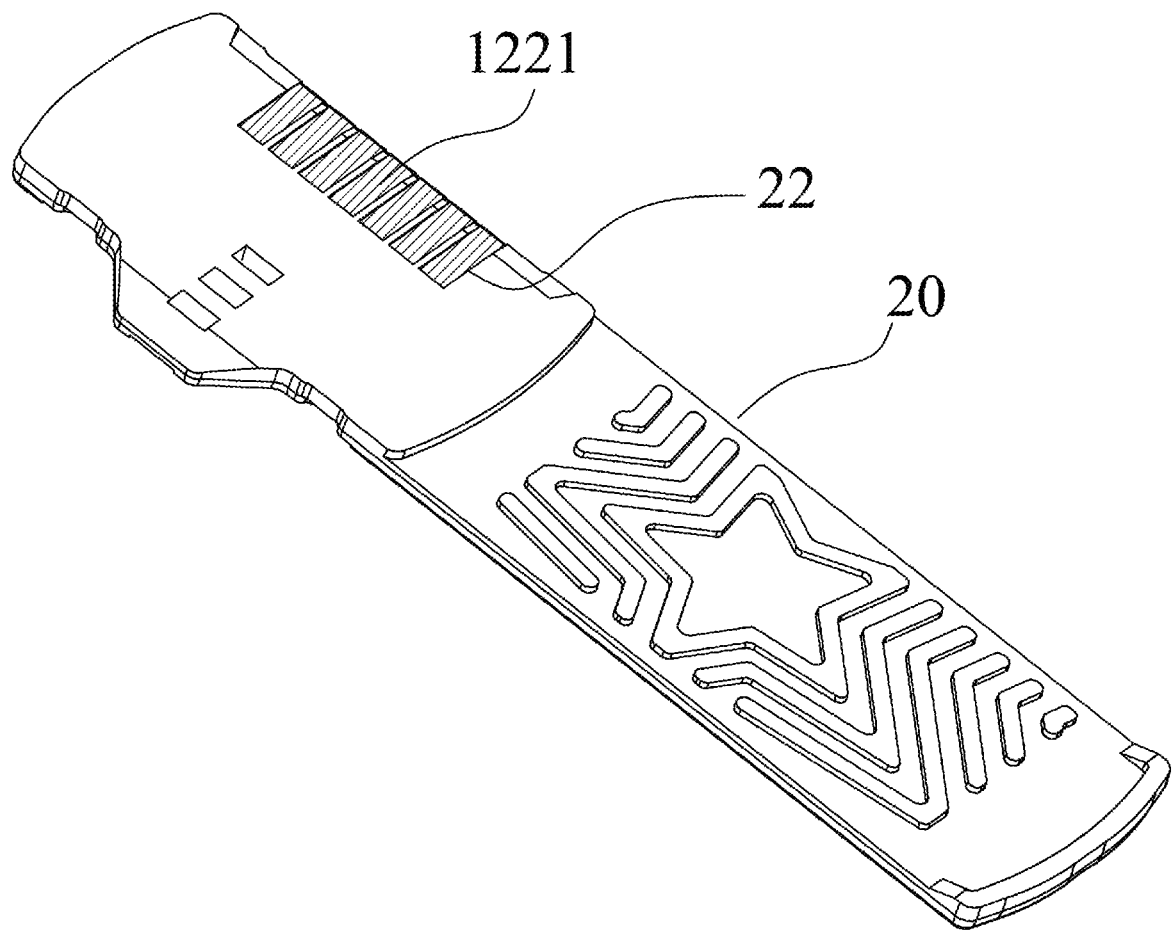
FIGS. 11-18 are schematic diagrams of alternative embodiments of the electrochemical test strip in the present invention.
Figure 12:
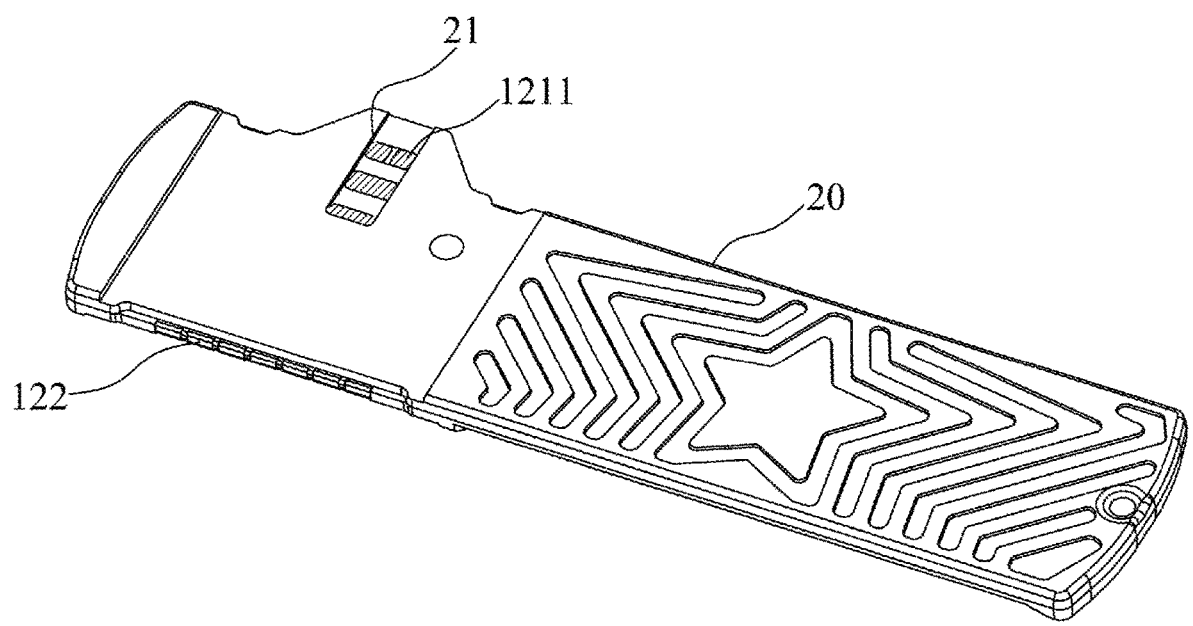

Please refer to FIGS. 11 and 12, this embodiment different from the previous one is that the accommodation portion 22 and the inspection slot 21 are disposed on the contrary surfaces.

The present invention also provides another aspect of embodiment, still comprising A. molding a metal conducting rack step; B. embedded injection of a conducting inspection body step; C. taking out the inspection body step; and D. bending an information outputting end step.

Figure 13:
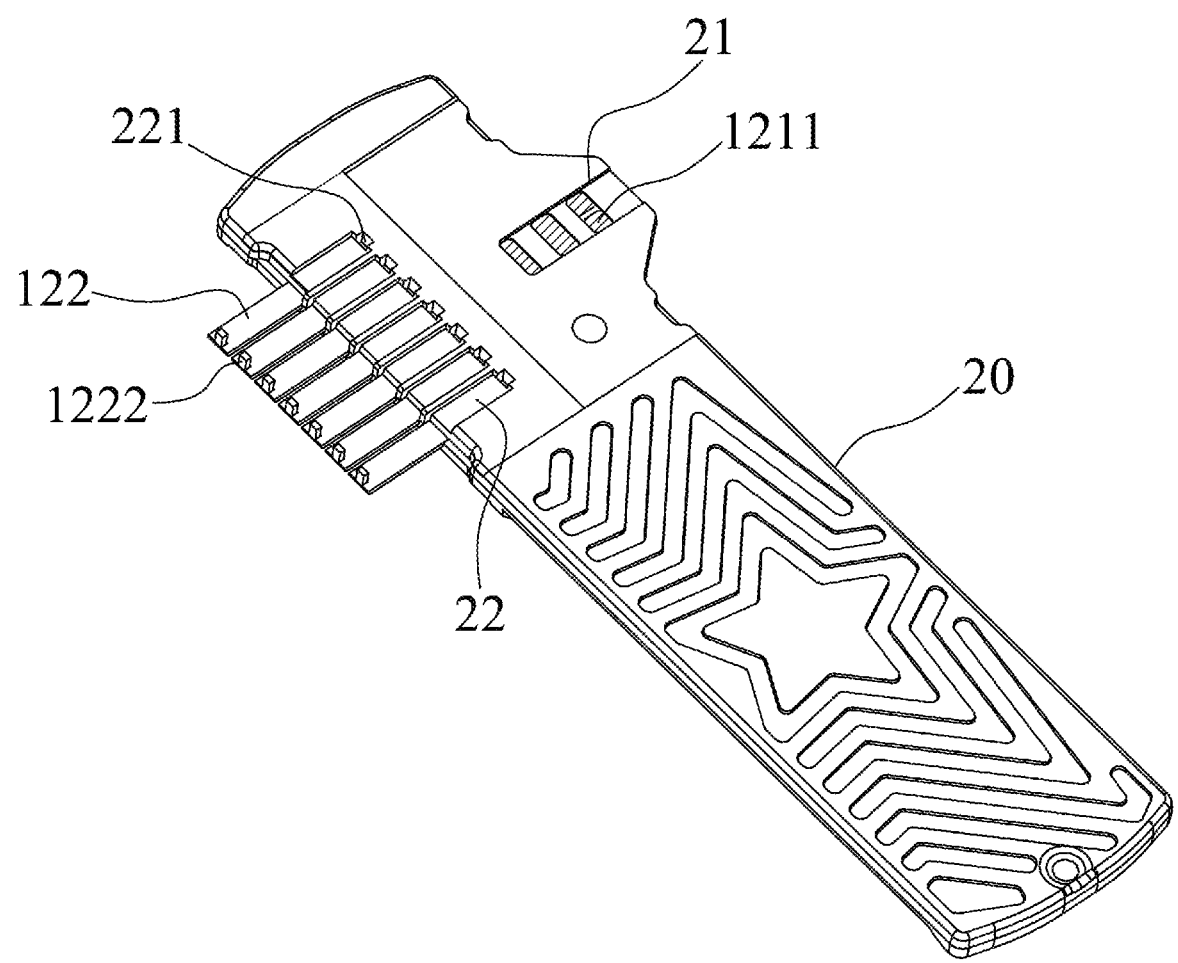

Please further refer to FIG. 13, the main point of this embodiment different from the previous one is that, before D. bending the information outputting end step, an end portion 1222 of the information outputting end 122 is bent to a predetermined angle, preferably 90 degree. Therefore, when performing D. bending the information outputting end step, the end portion 1222 is bent and can be embedded into at least one predetermined cavity 221, which is predetermined to correspond to the end portion 1222, on the accommodation portion 22.

The present invention additionally provides another aspect of embodiment, still comprising A. molding a metal conducting rack step; B. embedded injection of a conducting inspection body step; C. taking out the inspection body step; and D. bending an information outputting end step.

Figure 14:
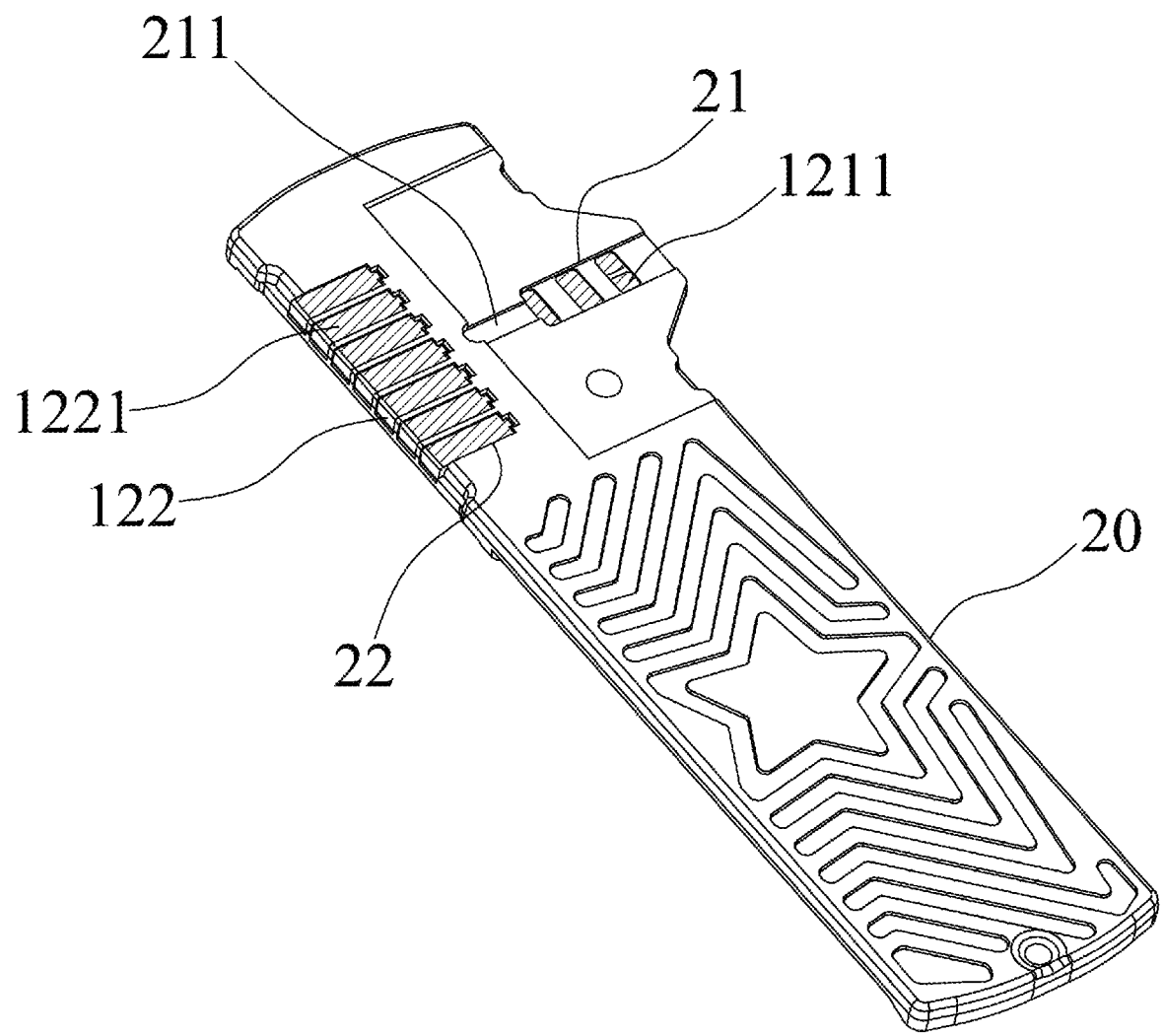

Please refer to FIG. 14, the main point of this embodiment different from the previous one is that, an inner end of the inspection slot 21 comprises a groove 211, which is used for connecting the inner end of the inspection slot 21 with outside environment in order to enhance the effect of ventilation.

The present invention preferably provides another aspect of embodiment, still comprising A. molding a metal conducting rack step; B. embedded injection of a conducting inspection body step; C1. separating a partial end step; D. bending an information outputting end step; and E. taking out the inspection body step.

Figure 15:
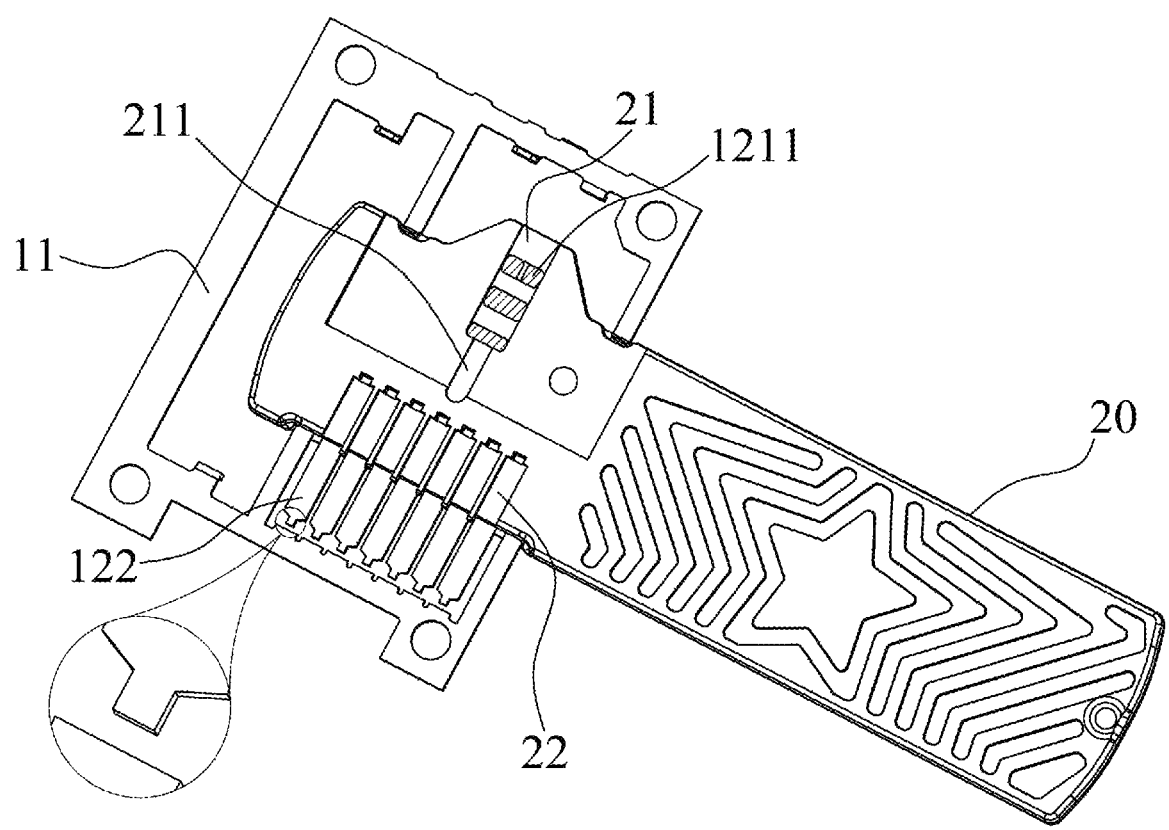
Figure 16:
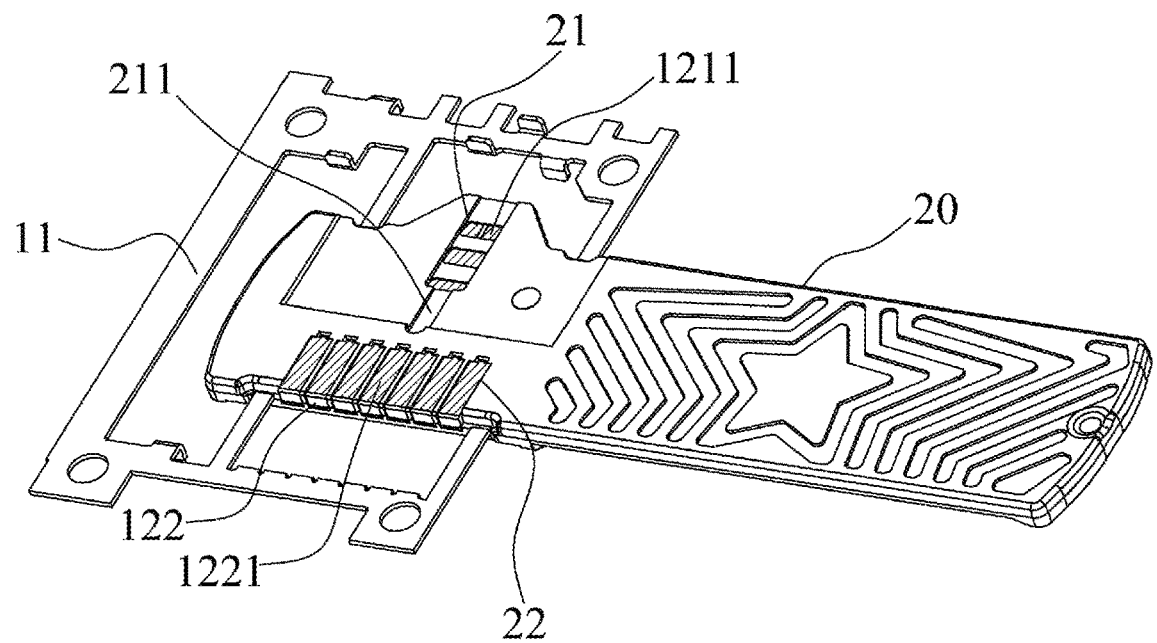

Please refer to FIGS. 15 and 16, the main point of this embodiment different from the previous one is C1. separating a partial end step, which separates the information outputting end 122 from the holder 11 after B. embedded injection of a conducting inspection body step. Next, D. bending the information outputting end step is to bend the information outputting end 122 toward the accommodation portion 22 of the inspection body 20, and to expose from the transmission contact surface 1221. Finally, E. taking out the inspection body step is to get the inspection body 20 from the holder 11 of the metal conductive rack 10.

Also, in this embodiment, before D. bending the information outputting end step, an end portion 1222 of the information outputting end 122 is bent to a predetermined angle, preferably 90 degree. Therefore, when performing D. bending the information outputting end step, the end portion 1222 is bent and can be embedded into at least one predetermined cavity 221, which is predetermined to correspond to the end portion 1222, on the accommodation portion 22.

It should be noted that when a number of conducting elements are four, they can be two pairs and used for two sets inspection electrode including different functions. This configuration can achieve the function that conventional technology, which usually uses three conducting electrodes, cannot achieve.

Figure 17:
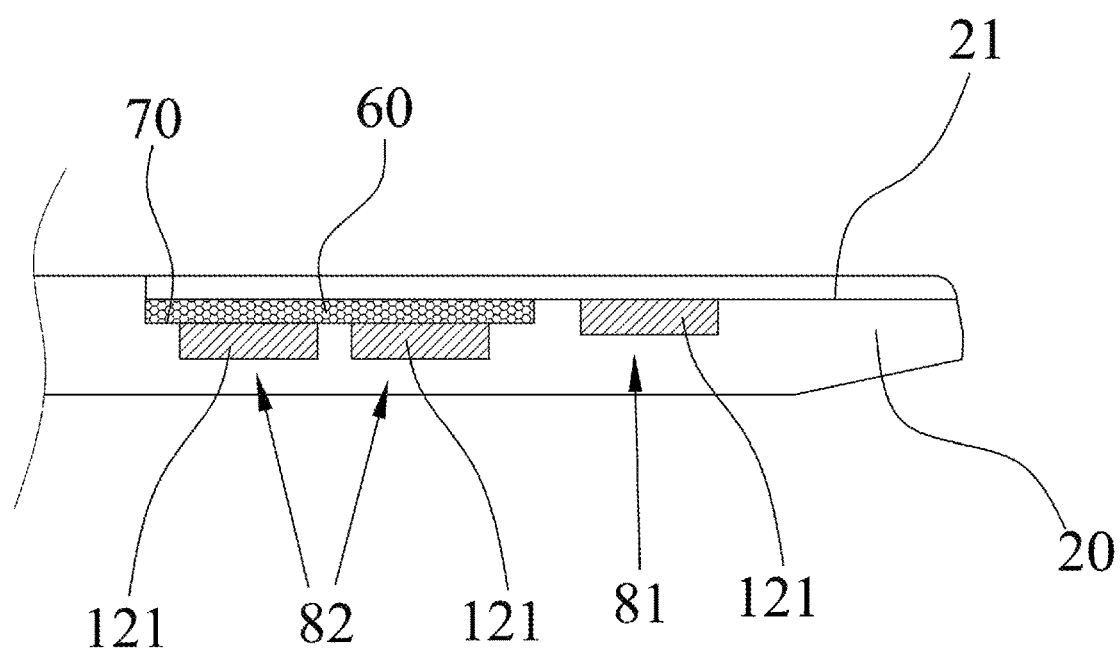
Figure 18:
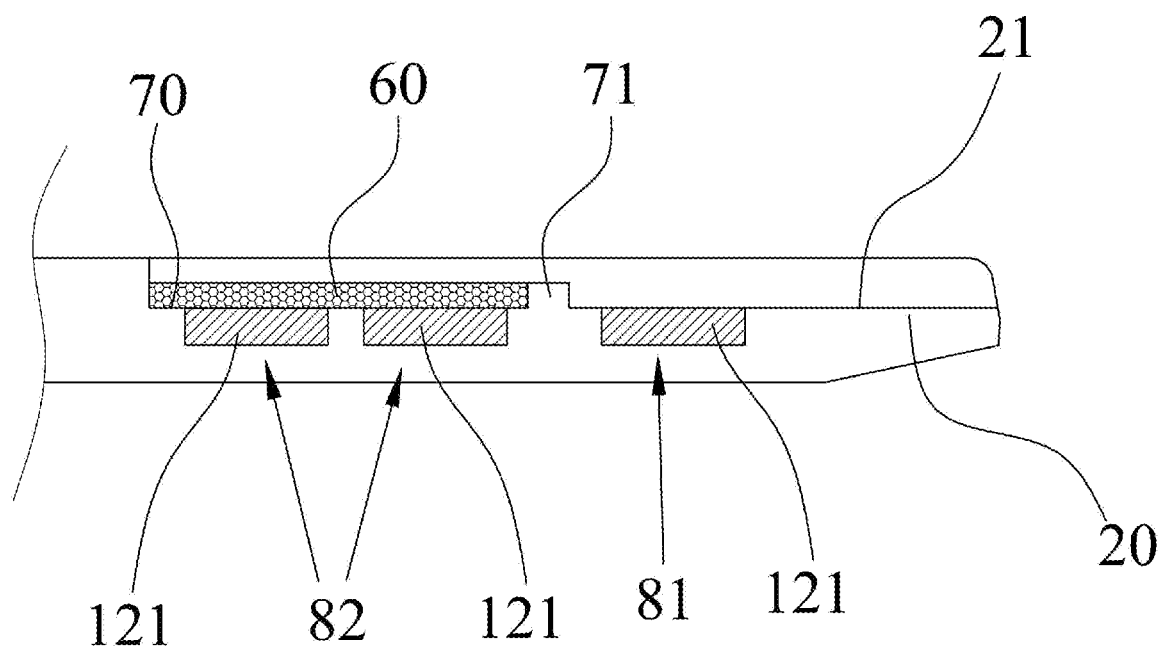

For example, please refer to FIGS. 17 and 18, when detecting blood sugar level, one pair information reception ends 121, which are located at exterior side and correspond to the inspection slot 21, of the conducting element 12 are used for a first reaction electrode assembly 81, and another pair information reception ends 121, which are located at inner side and correspond to the inspection slot 21, of the conducting element 12 are used for a second reaction electrode assembly 82. Furthermore, an electrochemical sensing portion 60 is only distributed on the second reaction electrode assembly 82 within the inspection slot 21, so that the inspection sample (e.g. blood) contacts the first reaction electrode assembly 81 after the inspection sample enters into the inspection slot 21, and then the inspection sample contacts the second reaction electrode assembly 82. That is, one conducting element 12 of the first reaction electrode assembly 81 and another conducting element 12 of the second reaction electrode assembly 82 are formed of an impedance circuit, which is used for calculating activation mechanism of MCU set in a detection instrument. The second reaction electrode assembly 82 is used for detecting after starting calculation, and an estimated blood sugar level is calculated by obtained current signal. Then, the first reaction electrode assembly 81 is activated to detect the signal of hematocrit (HCT), and the obtained signal value is used for adjustment coefficient of blood sugar level. Finally, the adjustment coefficient is incorporated into and calculated with the estimated blood sugar level to obtain an accurate blood sugar level.

The first reaction electrode assembly 81 can be an AC detection electrode assembly, and the second reaction electrode assembly 82 can be a DC detection electrode assembly. This is because AC detection electrode assembly can be used to directly detect hematocrit (HCT) without any enzyme reaction. In addition, the practice method for coating the electrochemical sensing portion 60 onto the second reaction electrode assembly 82 is to form a recess portion 70 on the bottom surface of the inspection slot 21, such that the electrochemical sensing portion 60 falls on the recess portion 70 and never overflows. Thus, the first reaction electrode assembly 81 and the electrochemical sensing portion 60 are separated effectively.

The recess portion 70 can be formed by recessing an area that the inspection slot 21 corresponds to the second reaction electrode assembly 82 (shown in FIG. 17), or by forming a bulged block 71 which corresponds to the outside of the second reaction electrode assembly 82 and is located on the inspection slot 21. When the tested sample flows, turbulent flow is generated by designing the recess portion 70 and thereby rising contact efficiency between the tested sample and the electrochemical sensing portion 60.

In addition, the first reaction electrode assembly 81 can be the second reaction electrode assembly 82 can be the DC detection electrode assembly, and those two electrode assemblies can measure different samples and have different functions. Besides aforementioned descriptions, four conducting elements 12 can be applied in other modes.

According to the setting method for a conducting element of an electrochemical test strip and electrochemical test strip thereof, the manufacturing process of the electrochemical test strip is not complex and has more precision and convenience, so the manufacturing cost can be reduced efficiently. Therefore, the present invention can be widely applied.

The above-mentioned descriptions represent merely the exemplary embodiment of the present invention, without any intention to limit the scope of the present disclosure thereto. Various equivalent changes, alternations or modifications based on the claims of present invention are all consequently viewed as being embraced by the scope of the present invention.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A setting method for a conducting element of an electrochemical test strip, comprising the following steps:
   A. molding a metal conducting rack step, to mold the metal conducting rack on a conducting metal substrate by a metal processing method, the metal conducting rack including a holder connected to a plurality of conducting elements; wherein each the conducting element comprises an information reception end having an external contact surface, and each the conducting element further comprises an information outputting end having a transmission contact surface;
   B. embedded injection of a conducting inspection body step, to inject molding the inspection body of a polymer plastic material from the plurality of conducting elements on the metal conducting rack, and wherein the inspection body comprises an inspection slot and at least one accommodation portion, the inspection slot is disposed on a side of the inspection body and is recessed into an inner side of the inspection body, and each the external contact surface of the information reception end exposes from the surface of inspection portion, the information outputting end is extended and pass through the inspection body and corresponds to the accommodation portion;
   C. taking out the inspection body step, to get the inspection body from the holder of the metal conducting rack; and
   D. bending the information outputting end step, to bend the information outputting end toward and into the accommodation portion of the inspection body, and to expose from the transmission contact surface.

2. A setting method for a conducting element of an electrochemical test strip, comprising the following steps:
   A. molding a metal conducting rack step, molding a metal conducting rack step, to mold the metal conducting rack on a conducting metal substrate by a metal processing method, the metal conducting rack including a holder connected to a plurality of conducting elements; wherein each the conducting element comprises an information reception end having an external contact surface, and each the conducting element further comprises an information outputting end having a transmission contact surface;

B. embedded injection of a conducting inspection body step, to inject molding the inspection body of a polymer plastic material from the plurality of conducting elements on the metal conducting rack, and wherein the inspection body comprises an inspection slot and at least one accommodation portion, the inspection slot is disposed on a side of the inspection body and is recessed into an inner side of the inspection body, and each the external contact surface of the information reception end exposes from the surface of inspection portion, the information outputting end is extended and pass through the inspection body, and corresponds to the accommodation portion;

C1. separating a partial end step, to separate the information outputting end from the holder;

D. bending the information outputting end step, to bend the information outputting end toward and into the accommodation portion of the inspection body, and to expose from the transmission contact surface; and E. taking out the inspection body step, to take out the inspection body from the holder of the metal conductive rack.

3. The setting method as defined in claim 2, wherein the accommodation portion and the inspection slot are disposed in an identical surface.

4. The setting method as defined in claim 2, wherein the accommodation portion and the inspection slot are disposed in contrary surfaces.

5. The setting method as defined in claim 2, wherein the step of D further comprises bending an end portion of the information outputting portion to a predetermined angle to embed the end portion of the information outputting portion into at least one predetermined cavity on the accommodation portion.

6. The setting method as defined in claim 2, wherein the external contact surface flushes with a bottom surface of the inspection slot.

7. The setting method as defined in claim 2, wherein the external contact surface is lower than a bottom surface of the inspection slot.

8. The setting method as defined in claim 2, wherein a number of the conducting elements are four.

9. The setting method as defined in claim 2, wherein an inner end of the inspection slot comprises a groove.

* * * * *